US012369018B1

(12) United States Patent
Shen et al.

(10) Patent No.: US 12,369,018 B1
(45) Date of Patent: Jul. 22, 2025

(54) METHOD AND ACCESS POINT FOR DETERMINING AND PROCESSING A TERMINAL IN A STICKY ROAMING STATE

(71) Applicant: TP-Link Systems Inc., Irvine, CA (US)

(72) Inventors: Dong Shen, Chengdu (CN); Rui Wang, Chengdu (CN); Yang Jiang, Chengdu (CN); Bin He, Chengdu (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/920,647

(22) Filed: Oct. 18, 2024

(51) Int. Cl.
*H04W 8/08* (2009.01)
*H04W 28/02* (2009.01)

(52) U.S. Cl.
CPC ......... *H04W 8/08* (2013.01); *H04W 28/0236* (2013.01)

(58) Field of Classification Search
CPC .............. H04W 8/08; H04W 28/0236; H04W 36/00833; H04W 36/00838; H04W 36/00; H04W 28/0226; H04W 64/00; H04W 68/04; H04W 8/02; H04W 88/00; H04W 88/02; H04W 88/08; H04W 8/00; H04W 8/005; H04W 8/18; H04W 76/00; H04W 76/10; H04W 76/11; H04W 76/27; H04W 92/02; H04W 4/02; H04W 4/029; H04W 52/0267; H04W 84/06; H04W 84/12; H04W 4/90; H04W 52/02; H04W 64/003; H04W 68/00; H04W 68/005;
(Continued)

(56) References Cited

U.S. PATENT DOCUMENTS 8,327,023 B2 * 12/2012 Zhao .............................. 709/245
2011/0124331 A1 * 5/2011 Jiang .......................... 455/432.1
(Continued)

FOREIGN PATENT DOCUMENTS

CN 101583151 A 11/2009
CN 111726837 A 9/2020
(Continued)

OTHER PUBLICATIONS

Pan, Ming-guo (CN 118828766 A), Terminal Roaming Method, Device, Storage Medium and System Based on Cloud AC (see title ; background second paragraph) (Year: 2024).*
(Continued)

*Primary Examiner* — Meless N Zewdu
(74) *Attorney, Agent, or Firm* — Loeb & Loeb LLP

(57) ABSTRACT

This disclosure provides a method for determining a terminal in a sticky state. The method includes: determining whether a roaming target determination is supported for a terminal by a first AP; performing an operation for the roaming target determination based on determining that the roaming target determination is supported; performing at least one of determining that the terminal is in a first sticky state based on a determination that the terminal is not connected to a second AP according to a roaming target suggestion of the first AP, based on a finding of one or more roaming targets by the operation; or determining that the terminal is in a second sticky state based on a strength of a signal between the terminal and the first AP being smaller than a first strength threshold, based on determining that the roaming target determination is not supported or a failure of the operation.

20 Claims, 4 Drawing Sheets

(58) Field of Classification Search
CPC ... H04W 84/00; H04W 36/14; H04W 36/142; H04W 36/144; H04W 92/00; H04M 2215/34; H04M 2215/7442; H04M 15/8038; H04M 1/72469; H04M 1/72418; H04M 1/72424; H04M 1/72466; G06F 9/4451; G06F 3/0488; G06F 3/048; H04B 7/18541; H04B 17/382; H04B 7/18523; H04B 7/18526; H04B 7/18539; H04B 7/18536; Y02D 30/70
See application file for complete search history.

(56) References Cited

U.S. PATENT DOCUMENTS

| | | | | |
|---|---|---|---|---|
| 2011/0256871 | A1* | 10/2011 | Cooper et al. | ................ 455/436 |
| 2018/0132170 | A1* | 5/2018 | Jabbar et al. | ......... H04W 48/18 |
| 2019/0274076 | A1* | 9/2019 | Kim et al. | ........ H04W 36/0058 |
| 2019/0335335 | A1* | 10/2019 | Schlangen et al. | ... H04W 16/10 |
| 2024/0381067 | A1* | 11/2024 | Stirling et al. | .......... H04W 8/12 |

FOREIGN PATENT DOCUMENTS

| | | | |
|---|---|---|---|
| CN | 113613298 A | 11/2021 | |
| CN | 115396969 A | 11/2022 | |
| CN | 113613236 B | 10/2023 | |
| WO | WO 2023/039593 A2 * | 3/2023 | ............ H04W 24/02 |
| WO | WO 2024/233197 A1 * | 4/2024 | .............. H04W 8/12 |

OTHER PUBLICATIONS

Shyu Jenn-Shan (TW 201216639 A), Mobile Station, Access Point, and Power Saving Method (see title) (Year: 2012).*
Hen, Jianxiang (WO 2023078341 A1), Roaming Method and Apparatus for Wireless Terminal (see title) (Year: 2023).*
Pekarske, Matthew (CN 110089157 A), System And Method for Evaluation of Non-optimal Roaming of the Client Device (see title) (Year: 2019).*
Sun, Fu-qing (113596864 A), Terminal Roaming Guiding Method, Device, Device and Computer Readable Storage Medium (see title) (Year: 2021).*

* cited by examiner

METHOD AND ACCESS POINT FOR DETERMINING AND PROCESSING A TERMINAL IN A STICKY ROAMING STATE

TECHNICAL FIELD

The present disclosure relates to wireless communication, in particular to a method and access point (AP) for determining and processing a terminal in a sticky state.

BACKGROUND

In the multi-AP Wi-Fi network, the connection of a terminal may need to switch from one AP to another AP due to movements and other reasons, which is called roaming, to ensure continuous and stable access to Wi-Fi network services. In general, the roaming is divided into active roaming and passive roaming. In the active roaming, the terminal selects a roaming target and triggers the roaming according to the signal strength, i.e., the terminal performs the roaming without a roaming target suggestion of the AP. In the passive roaming, the terminal selects and triggers the roaming based on the roaming target suggestion of the AP.

No matter the active roaming or the passive roaming, there may be a sticky phenomenon that the terminal should switch from the currently connected AP to another AP, but the terminal does not perform this switching due to some reasons.

SUMMARY

Based on the above, the present disclosure provides a method, access point and non-transitory computer readable medium for determining and processing a terminal in a sticky state.

In an aspect of the present disclosure, the present disclosure provides a method performed by a first access point (AP) for determining a terminal in a sticky state, which is connected to the first AP, the method comprising: determining whether a roaming target determination is supported for the terminal by the first AP; performing an operation for the roaming target determination based on determining that the roaming target determination is supported; performing at least one of: determining that the terminal is in a first sticky state based on a determination that the terminal is not connected to a second AP according to a roaming target suggestion of the first AP, based on a finding of one or more roaming targets by the operation; or determining that the terminal is in a second sticky state based on a strength of a signal between the terminal and the first AP being smaller than a first strength threshold, based on determining that the roaming target determination is not supported or a failure of the operation.

In another aspect of the present disclosure, the present disclosure provides a first access point (AP) for determining a terminal in a sticky state, which is connected to the first AP, comprising: a memory; and a processor coupled with the memory and configured to: determine whether a roaming target determination is supported for the terminal by the first AP; perform an operation for the roaming target determination based on determining that the roaming target determination is supported; perform at least one of: determining that the terminal is in a first sticky state based on a determination that the terminal is not connected to a second AP according to a roaming target suggestion of the first AP, based on a finding of one or more roaming targets by the operation; or determine that the terminal is in a second sticky state based on a strength of a signal between the terminal and the first AP being smaller than a first strength threshold, based on determining that the roaming target determination is not supported or a failure of the operation.

In yet another aspect of the present disclosure, the present disclosure provides a non-transitory computer readable medium storing instructions, when executed by a processor, causing the processor to: determine whether a roaming target determination is supported for a terminal by a first AP, wherein the terminal is connected to the first AP; perform an operation for the roaming target determination based on determining that the roaming target determination is supported; perform at least one of: determining that the terminal is in a first sticky state based on a determination that the terminal is not connected to a second AP according to a roaming target suggestion of the first AP, based on a finding of one or more roaming targets by the operation; or determining that the terminal is in a second sticky state based on a strength of a signal between the terminal and the first AP being smaller than a first strength threshold, based on determining that the roaming target determination is not supported or a failure of the operation.

The present disclosure further provides an access point comprising means for performing methods as described according to various embodiments in the disclosure.

The present disclosure further provides a computer program product comprising instructions, when executed by a processor causes the processor to perform methods as described according to various embodiments in the disclosure.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements. In the accompanying drawings.

DETAILED DESCRIPTION

Figure 1:
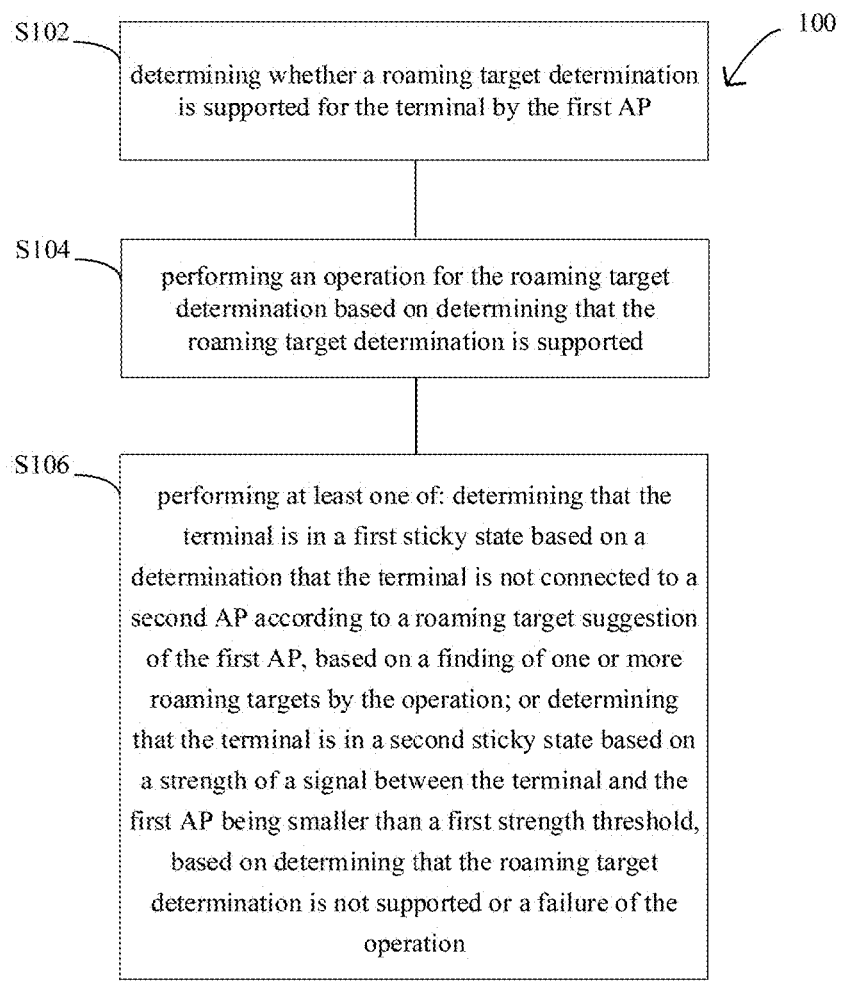
FIG. 1 shows a flow diagram illustrating a method for determining a terminal in a sticky state according to an embodiment of the present disclosure.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the specific meanings of the above terms in the present disclosure may be understood on a case-by-case basis.

In addition, technical features involved in different embodiments of the present disclosure described below may be combined with each other as long as no conflicts occur therebetween. Further, figures are merely for illustration and are simplified for brevity and thus may be not exactly the same as practical implementations. For example, in figures, the processing delay of devices may be omitted.

In the present disclosure, an AP, which may be interchangeably referred to as a wireless access point (WAP), is a communication device that can communicate with a non-AP (e.g., STA) in a WLAN via one or more links and that allow the non-AP to be connected to a wired network. The AP usually is connected to a router (via a wired network) as a standalone device, but it can also be integrated with or employed in the router.

Likewise, in the present disclosure, a non-AP (e.g., a station or terminal, which is interchangeably referred to as an STA) is a communication device that can communicate with an AP via one or more links. The STA can be any device that contains an IEEE 802.11-conformant media access control (MAC) and physical layer (PHY) interface to the wireless medium (WM). For example, an STA may be a laptop, a desktop personal computer (PC), a personal digital assistant (PDA), an access point, or a Wi-Fi phone in a WLAN environment. The STA may be fixed or mobile. In the WLAN environment, the terms "STA", "terminal", "wireless terminal", "user", "user device", and "node" are often used interchangeably.

In the present disclosure, a STA in a WLAN may work as an AP at a different occasion, and vice versa. This is because communication devices in the context of IEEE 802.11 (Wi-Fi) technologies may include both STA hardware components and AP hardware components. In this manner, the communication devices may switch between a STA mode and an AP mode, based on actual WLAN conditions and/or requirements. In various embodiments below, a non-AP STA may refer to an STA or terminal in a WLAN that is not implemented as an AP.

As described above, currently, the roaming is divided into the active roaming and the passive roaming. In practice, the passive roaming can be carried out based on a basic service set (BSS) Transition Management (BTM) function. Further, no matter the active roaming or the passive roaming, there may be a sticky phenomenon that the terminal (i.e., STA) should switch from the currently connected AP to another AP, but the terminal does not perform this switching due to some reasons. Specifically, the stickiness of the active roaming terminal (which may be called an active roaming stickiness or a weak signal stickiness herein) shows that even if the strength between the terminal and the currently connected AP is poor and there are APs with a better signal quality around the currently connected AP, the STA still insists on staying connected to the currently connected AP, which easily leads to a serious imbalance in the distribution of terminals under different APs, thus reducing the air interface efficiency of the whole network. The stickiness of the passive roaming terminal (which may be called a passive roaming stickiness or a BTM device stickiness herein) shows that the terminal always rejects AP's roaming related request or roaming target suggestion (such as 11k/v BTM roaming target suggestion for the terminal supporting 802.11k/v protocols, which are protocols for the passive roaming of the terminal.)

As shown above, the stickiness of the active roaming terminal is different from that of the passive roaming terminal. Therefore, it is necessary to design a scheme that can be compatible with both active roaming terminals (for example, terminals that do not support the 802.11k/v protocols) and passive roaming terminals (for example, terminals that support 802.11k/v protocols), and that can determine and solve both the active roaming stickiness and the passive roaming stickiness appropriately (e.g., when and how to determine the active roaming stickiness and the passive roaming stickiness, and how to process the active roaming stickiness and the passive roaming stickiness after the determining).

Based on the above, the disclosure provides a method, a communication device (e.g., AP), and a non-transitory computer readable medium for determining and processing a terminal in a sticky state.

FIG. 1 shows a flow diagram illustrating a method 100 for determining a terminal in a sticky state according to an embodiment of the present disclosure. This method 100 may be performed by an AP (i.e., a first AP), for example. The terminal is connected to the AP. As shown in FIG. 1, the method 100 for determining the terminal in the sticky state starts at block S102. At block S102, the AP determines whether a roaming target determination is supported for the terminal by the AP. In an embodiment, this determination may comprise determining whether both the AP and the terminal support the roaming target determination (e.g., features related to the roaming target determination). In another embodiment, this determination may comprise only determining whether the terminal supports the roaming target determination. Exemplarily, in a case of only determining whether the terminal supports the roaming target determination, determining whether the roaming target determination is supported for the terminal by the AP may comprise determining whether the terminal supports a determination of strengths of signals of one or more AP around the AP (e.g., determining whether the terminal supports the 802.11k/v protocol), and determining whether the roaming target determination is supported for the terminal by the AP based on whether the terminal supports the determination of strengths of signals of one or more AP around the AP. If it is determined the terminal supports the determination of strengths of signals of one or more AP around the AP (e.g., the terminal supports the 802.11k/v protocol), it is determined that the roaming target determination is supported for the terminal by the AP. If it is determined the terminal does not support the determination of strengths of signals of one or more AP around the AP (e.g., the terminal does not support the 802.11k/v protocol), it is determined that the roaming target determination is not supported for the terminal by the AP.

At block S104, the AP performs an operation for the roaming target determination based on (e.g., in response to) determining that the roaming target determination is supported. Exemplarily, in a case where the roaming target determination is based on a signal measurement by the terminal, the operations may comprise transmitting a measurement request (e.g., an 11k beacon request) to the terminal to request the terminal to perform the signal measurement related to the roaming target determination (e.g., an 11k beacon measurement), receiving a result of the signal measurement performed by the terminal, and determining (i.e., finding) one or more roaming targets based on the result of the signal measurement, e.g., by performing a roaming algorithm to estimate a throughput between the terminal and other APs when the terminal is connected to the other APs. Alternatively, in a case where the roaming target determination is based on reports of other APs, the operations may comprise receiving the reports from the other APs.

In an embodiment, the operation for the roaming target determination can be performed without limitation. In another embodiment, the operation for the roaming target determination can be performed conditionally, e.g., only when a strength of a signal (e.g., received signal strength indication (RSSI) or reference signal receiving power (RSRP) and the like) between the terminal and the AP is smaller than a strength threshold (i.e., a second strength threshold). In this case, performing the operation for the roaming target determination can comprise: determining whether the strength of the signal between the terminal and the AP is smaller than the second strength threshold; and performing the operation for the roaming target determination, based on determining that the strength of the signal is smaller than the second strength threshold.

Throughout this disclosure, in an embodiment, the strength of the signal can be the strength of an uplink signal between the terminal and the AP (e.g., uplink RSSI). In another embodiment, the strength of the signal can be the strength of a downlink signal between the terminal and the AP (e.g., estimated downlink RSSI). In yet another embodiment, the strength of the signal can be both the strength of the uplink signal and the strength of the downlink signal between the terminal and the AP. In this case, the same strength threshold can be set for the strength of the uplink signal and the strength of the downlink. Alternatively, the different strength thresholds can be set for the strength of the uplink signal and the strength of the downlink. Exemplarily, the strength of the downlink signal can be determined by determining the strength of the uplink signal between the terminal and the AP; and determining the strength of the downlink signal based on the strength of the uplink signal and a strength offset, e.g., by the determined strength of the uplink signal minus the strength offset. In an embodiment, the strength offset can be a fixed strength offset, which can be determined based on a practice measurement. In another embodiment, the strength offset can dynamically change. For example, in a case where the AP determines whether there is a better AP (i.e., roaming target) based on a signal measurement performed by the terminal (e.g., the 11k beacon measurement), the strength offset is (determined) updated based on the signal measurement performed by the terminal (e.g., a result of the 11k beacon measurement) and the determined (i.e., measured) strength of the uplink signal (e.g., uplink RSSI). For example, the strength offset can be updated based on the following equation:

$$\text{offset}\_u = f(\text{offset}\_c, S\_ul, S\_dl), \quad (1)$$

where f ( ) indicates a function, offset_u indicates the updated strength offset, offset c indicates the current strength offset, S_ul indicates the strength of the uplink signal measured by the AP, and S_dl indicates the strength of the downlink signal reported by the terminal. Further, the initial strength offset can be a practice measurement which is similar to the fixed strength offset.

Compared to the strength of the uplink signal, with the strength of the downlink signal, the link condition between the terminal and the AP can be better assessed, since the power of the AP may change which may result in a situation where the strength of the uplink signal does not change but the strength of the downlink signal received by the terminal becomes very weak due to the power of the AP changes small. In addition, by updating the strength offset based on the signal measurement performed by the terminal and the strength of the uplink signal, the strength of the downlink signal can be estimated more accurately.

Returning to FIG. 1, at block S106, the AP performs at least one of: based on (e.g., in response to) a finding of one or more roaming targets by the operation for the roaming target determination, determining that the terminal is in a first sticky state (i.e., the passive roaming stickiness or the BTM device stickiness) based on a determination that the terminal is not connected to another AP (i.e., a second AP) according to a roaming target suggestion of the first AP; or based on (e.g., in response to) determining that the roaming target determination is not supported or a failure of the operation (for the roaming target determination), determining that the terminal is in a second sticky state (i.e., the active roaming stickiness or the weak signal stickiness) based on the strength of the signal between the terminal and the first AP being smaller than a strength threshold (i.e., a first strength threshold).

In the disclosure, the determination of whether the terminal is in the first sticky state is performed in a case where the roaming target determination is supported for the terminal by the AP, the operation for the roaming target determination successes and the operation finds one or more roaming targets. In other words, the determination of whether the terminal is in the first sticky state is performed in a case where the AP can determine whether there is a roaming target and the roaming target is determined (found) by the AP. As described above, in the disclosure, it is determined that the terminal is in the first sticky state based on the determination that the terminal is not connected to another AP according to the roaming target suggestion of the first AP, and accordingly, it is determined that the terminal is not in the first sticky state based on the determination that the terminal is connected to another AP according to the roaming target suggestion of the first AP. Please note that in the disclosure, another AP stated above (i.e., the second AP or the target AP) can be an AP in the roaming target suggestion. Of course, another AP stated above can be an AP not in the roaming target suggestion.

In this disclosure, determining whether the terminal is connected to the second AP according to the roaming target suggestion of the first AP can comprise: transmitting by the first AP, the roaming target suggestion to the terminal if the first AP finds at least one roaming target, and thereafter, determining, by the first AP, whether the terminal is connected to the second AP according to the roaming target suggestion of the first AP. In an embodiment, transmitting the roaming target suggestion to the terminal may comprise sending a request (e.g., an 11v BTM request) that contains the roaming target(s) to the terminal. In another embodiment, transmitting the roaming target suggestion to the terminal may comprise sending a request that contains no roaming targets to the terminal. In this case, the terminal itself selects a target AP to connect.

Regarding determining whether the terminal is connected to the second AP according to the roaming target suggestion of the first AP, in an embodiment, this determination may comprise determining whether the terminal responds to the request of the first AP with a response indicating that the terminal accepts roaming target suggestion of the first AP and prepare to connect or already has connected to the second AP according to the roaming target suggestion of the first AP (e.g., a successful 11v BTM response), in a given time after the first AP sends the request to the terminal. In another embodiment, this determination may comprise determining whether the first AP receives, from another AP, a signal indicating that the terminal is connected to it, in a given time after the first AP sends the roaming target suggestion to the terminal. Additionally, it can be determined that the roaming is successful according to determining that the terminal is connected to the second AP according to the roaming target suggestion of the first AP. Please note that in the disclosure, the response stated above (the response which the terminal responds to the request of the first AP) can be a successful 11v BTM response that contains roaming target(s) that is (are) the same as that (those) contained in the roaming target suggestion that first AP sends to the terminal, or a successful 11v BTM response that contains roaming target(s) that is (are) different from that (those) contained in the roaming target suggestion that first AP sends to the terminal, or a successful 11v BTM response that contains no roaming targets. More particularly, the above successful 11v BTM response means an 11v BTM response whose BTM Status Code is 0 (which means the terminal accepts the roaming target suggestion of the first AP).

In addition, in an embodiment, determining whether the terminal is in the first sticky state may comprise determining that the terminal is in the first sticky state in response to determining that the terminal is not connected to another AP. That is, it is determined that the terminal is in the first sticky state as long as it is determined that the terminal is not connected to another AP based on the roaming target suggestion. In another embodiment, determining that the terminal is in the first sticky state comprises determining that the terminal is in the first sticky state in response to determining that the terminal is not connected to the second AP consecutively for L1 times, wherein L1 is a positive integer.

In the disclosure, determining that the terminal is in a second sticky state is based on determining that the roaming target determination is not supported or a failure of the operation for roaming target determination, as described above. That is, the determination of whether the terminal is in the second sticky state is performed in a case where the AP can not determine whether there is a roaming target. Moreover, as described above, in the disclosure, it is determined that the terminal is in the second sticky state based on the determination that the strength of the signal is smaller than the first strength threshold, and accordingly, it is determined that the terminal is not in the second sticky state based on the determination that the strength of the signal is not smaller than the first strength threshold.

More particularly, in an embodiment, determining that the terminal is in the second sticky state may comprise determining that the terminal is in the second sticky state in response to determining that the strength of the signal is smaller than the first strength threshold. That is, it is determined that the terminal is in the second sticky state as long as determining that the strength of the signal is smaller than the first strength threshold. In another embodiment, determining that the terminal is in the second sticky state may comprise: determining that the terminal is in the second sticky state in response to the strength of the signal being smaller than the first strength threshold consecutively for L2 times, wherein L2 is positive integer. In yet another embodiment, determining that the terminal is in the second sticky state may comprise: determining that the terminal is in the second sticky state in response to the strength of the signal being smaller than the first strength threshold for M times out of N times, wherein M, and N are positive integers, and wherein M<N.

In this disclosure, the failure of the operation for the roaming target determination is determined if any operation related to the roaming target determination fails. Exemplarily, in a case the operations comprises transmitting a measurement request (e.g., an 11k beacon request) to the terminal to request the terminal to perform the signal measurement related to the roaming target determination (e.g., an 11k beacon measurement), receiving a result of the signal measurement performed by the terminal, and determining whether one or more roaming targets exist based on the result of the signal measurement, in an embodiment, the failure of the operation for the roaming target determination is determined if transmitting the measurement request fails (e.g., the terminal does not receive the measurement request due to some reasons (e.g., a poor channel quality)), or the signal measurement performed by the terminal fails due to some reasons (e.g., the terminal has defect so that it can not perform the signal measurement as the request of first AP, or the terminal refuses to perform the signal measurement due to it is busy and the like), or receiving the result of the signal measurement fails due to some reasons (e.g., the poor channel quality), or determining whether one or more roaming targets exist fails (e.g., finding no valid entry in the measurement result that the terminal reports).

Further, in this disclosure, in an embodiment, the first strength threshold for determining whether the terminal is in the second sticky state can be the same as the second strength threshold for determining whether to perform the operation for the roaming target determination. In another embodiment, the first strength threshold can be smaller than the second strength threshold. Exemplarily, the first strength threshold can be set as a strength that causes a bit error ratio (BER) or a packet error ratio (PER) of data transmission between the terminal and the AP to be right larger than an acceptable BER or an acceptable PER, and the second strength threshold can be set as a strength larger than the first strength threshold accordingly. The reason for setting the second strength threshold to be larger than the first strength threshold is the roaming target suggestion is better than (forcibly and directly) disconnecting the terminal from the currently connected AP. This is because, with the operation for the roaming target determination, the AP can determine whether there is a better AP, so the roaming target suggestion can be provided only when there is a better AP and the best AP can be selected for the roaming target suggestion. Compared with (forcibly and directly) disconnecting the terminal from the currently connected AP, the roaming target suggestion is more likely to cause the STA to roam to the best AP.

In this way (i.e., the first strength threshold is smaller than the second strength threshold), the operation related to the roaming target determination can be triggered first to find a better AP (a roaming target), thus ensuring that roaming target suggestion is tried first when there is a better AP; and when it is impossible to determine whether there is a better AP, the determination of the second sticky state and the disconnection of the terminal from the current connected AP under the second sticky state are tried. That is, if the AP can provide the roaming target suggestion to the terminal, the terminal can be recommended to be connected to a better AP before the signal strength between the terminal and the current connected AP becomes too weak to have good communication quality, thus improving communication quality and avoid communication interruption. If the AP can not provide the roaming target suggestion to the terminal, the terminal can keep connecting to the currently connected AP as long as possible so that the current communication of the terminal does not suspend as much as possible, thereby providing a better roaming experience for the client of the terminal.

Further, in the disclosure, the strength of the signal involved in S106 can be the strength of the uplink signal or the downlink signal, as described above. Details for the strength of the signal are not repeated here for brevity.

In this disclosure, a terminal that is determined to be in the first sticky state can be re-determined to be a non-sticky terminal in a case where the terminal is connected to the target AP (i.e., the second AP as described above) according to the roaming target suggestion of the first AP, or a period for which the terminal is in the first sticky state is larger than a predefined period (i.e., a fifth predefined period). Additionally, in this disclosure, if the terminal is connected to another AP due to its own reasons, rather than a trigger of the currently connected AP, the terminal that is determined to be in the first sticky state may be still considered to be in the first sticky state even if the terminal is connected to another AP. For example, a state flag indicating that the terminal is in the first sticky state is not eliminated.

Further, a terminal that is determined to be in the second sticky state can be re-determined to be a non-sticky terminal in a case where the terminal is connected to the target AP (i.e., the second AP as described above), or a period for which the terminal is in the second sticky state is larger than a predefined period (i.e., a sixth predefined period), or the strength of the signal between the terminal and the current connected AP (i.e., the first AP) is not smaller than the first strength threshold, or the terminal is disconnected from the current connected AP (i.e., the first AP).

In the disclosure, when performing (enabling) the determination of whether the terminal is in the first sticky state, the determination of whether the terminal is in the second sticky state can be disabled, and vice versa. In addition, in a case where conditions for determining whether the terminal is in the first and second sticky state are not met, e.g., it is determined that the roaming target determination is supported for the terminal by the AP and the operation for the roaming target determination successes, but no roaming target is determined (found) by the operation, both the determination whether the terminal is in the first sticky state and the determination whether the terminal is in the second sticky state can be disabled.

In the above, the method for determining a terminal in a sticky state is described with reference to FIG. 1. The method performs the determination of the terminal in different sticky states (i.e., the active roaming stickiness and the passive roaming stickiness) based on whether the AP can determine whether there is the roaming target, which can be compatible with the active roaming terminals and the passive roaming terminals and determines the active roaming stickiness and the passive roaming stickiness at the same time appropriately, thereby facilitating subsequent processes (e.g., disconnecting the terminal from the current connected AP).

In the following, the disclosure will describe how to deal with the terminal in the sticky state (the first or the second sticky state). In general, if it is determined that the terminal is in the first or the second sticky state, the AP can disconnect the terminal from the AP (i.e., currently connected AP). Exemplarily, the AP disconnecting the terminal from the AP can comprise but is not limited to, one of the following ways: the AP transmits a disassociation (i.e., or disconnection) frame to the terminal, or the AP transmits a de-authentication frame to the terminal.

In an embodiment, the AP can disconnect the terminal in the sticky state from the AP upon it determines that the terminal is in the (first or second) sticky state. In another embodiment, the AP can disconnect the terminal in the sticky state from the AP in a case where it determines that the terminal is in the sticky state and disconnecting conditions are met.

Specifically, in a case where it is determined that the terminal is in the first sticky state, the AP can disconnect the terminal from the AP in a case where an amount of traffic between the terminal and the AP is smaller than or equal to a traffic threshold, a state of the terminal is not non-switchable (i.e., the terminal is not a non-switchable terminal), and a communication capability of the current connected AP (i.e., the first AP) for serving the terminal is smaller than that of the target AP (i.e., the second AP). In this way (i.e., disconnecting the terminal in the sticky state from the current AP in a case where the disconnecting conditions are met), it is guaranteed that the terminal is connected to a better AP without affecting the current communication of the terminal.

In an embodiment, it is determined that the amount of traffic is smaller than or equal to the traffic threshold in a case where the amount of traffic within a predefined period is smaller than or equal to the traffic threshold. In another embodiment, it is determined that the amount of traffic is smaller than or equal to the traffic threshold in a case where the amount of traffic within each of a predefined number of a predefined period is smaller than or equal to the traffic threshold.

Regarding the non-switchable state, in an embodiment, the state of the terminal can be determined to be non-switchable in a case where the terminal is connected back to the AP in a predefined period (i.e., a first predefined period) after being disconnected from the AP consecutively for predefined times, or the terminal is not connected to any AP in another predefined period (i.e., a second predefined period, which can be the same as or different from the first predefined period) after being disconnected from the AP. Exemplarily, in an embodiment, whether the terminal is connected to another AP after disconnecting it from the currently connected AP can be determined based on the forwarding database (FDB). Specifically, the AP from which the terminal is disconnected can check the FDB to determine whether information related to the disconnected terminal (e.g., the name of the interface which the terminal is affiliated with) changes. If the information related to the disconnected terminal changes, it is determined that the terminal is connected to another AP. Otherwise, it is determined that the terminal is not connected to another AP. In another embodiment, the AP to which the terminal is currently connected can transmit a signal to the AP from which the terminal is disconnected to indicate that the terminal has been connected to another AP, so that the AP from which the terminal is disconnected can determine that the terminal has connected to another AP if receiving this signal.

After the state of the terminal is determined to be non-switchable, for the terminal whose state is non-switchable, the AP does not disconnect the terminal from the AP (i.e., the currently connected AP) within in a predefined period (i.e., a third predefined period).

Further, the state of the terminal can be determined to be switchable from non-switchable in a case where: the terminal is disconnected from the currently connected AP (i.e., the first AP); or a change of a location of the terminal relative to the location of the terminal when its state is determined to be non-switchable is larger than a predefined amount of change. In an embodiment, whether the change of the location of the terminal is larger than the predefined amount of change can be determined immediately after the state of the terminal is determined to be non-switchable. In another embodiment, whether the change of the location of the terminal is larger than the predefined amount of change can be determined when or after the non-switchable terminal keeps being connected to (has been connected to) the currently connected AP for the third predefined period. In this case, determining the change of the location of the terminal to be larger than the predefined amount of change can comprise, determining whether the terminal keeps being connected to the first AP for the third predefined period after its state is determined to be non-switchable; and based on determining that the terminal keeps being connected to the first AP for the third predefined period, determining whether the change of the location of the terminal to be larger than the predefined amount of change. Exemplarily, determining that the change of the location of the terminal is larger than the predefined amount of change can be based on the following equation:

$$abs(ave-i) \geq s \quad (2)$$

where abs ( ) indicates an absolute value, ave indicates an average of last P measured strengths of the signal between the terminal and the first AP, P being an integer, i indicates the strength of the signal between the terminal and the first AP when the state of the terminal is determined to be non-switchable, and s is a predefined strength (i.e., a second predefined strength).

In addition, if the above condition for determining the state of the terminal to be switchable from non-switchable is not met, it is determined the state of the terminal is still non-switchable. That is, a flag indicating the terminal is non-switchable can be extended for another third predefined period.

Regarding the communication capability, it may be determined that the communication capability of the currently connected AP (e.g., the first AP) for serving the terminal is smaller than that of the target AP (e.g., the second AP) in a case at least one of following condition met: 1. the strength of the signal between the terminal and the currently connected AP being smaller than a third strength threshold; 2. the strength of the signal between the terminal and the currently connected AP being equal to or larger than the third strength threshold and smaller than a fourth strength threshold, the frequency band of the target AP (i.e., the second AP) being equal to or larger than that of the currently connected AP, and the strength of the signal between the terminal and the target AP being larger than the strength of the signal between the terminal and the currently connected AP by a predefined strength (i.e., a first predefined strength); or 3. the strength of the signal between the terminal and the currently connected AP being equal to or larger than the third strength threshold and smaller than the fourth strength threshold, a throughput of the target AP being larger than that of the currently connected AP by a predefined throughput, and the strength of the signal between the terminal and the target AP being larger than the strength of the signal between the terminal and the currently connected AP. In an embodiment, the predefined throughput can be fixed. In another embodiment, the predefined throughput can be a dynamically changing value, e.g., a dynamically changing value based on the throughput of the currently connected AP.

Regarding the terminal in the second sticky state, the first AP can disconnect the terminal from the first AP in a case where an amount of traffic between the terminal and the first AP is smaller than or equal to a traffic threshold, a state of the terminal is not non-switchable, and the first AP is a non-edge AP. The amount of traffic condition and the non-switchable state condition are the same as those described with respect to disconnecting the terminal in the first sticky state, whose details are not repeated herein for brevity.

Regarding the non-edge AP, in an embodiment, the AP (i.e., the first AP) can be determined to be the non-edge AP in a case where there is at least one available AP around the first AP. In another embodiment, the AP can be determined to be the non-edge AP in a case where not only there is at least one available AP around the currently connected AP, but also a strength of a signal between any terminal and the AP when any terminal is associated with the AP is larger than a strength threshold (i.e., a fifth strength threshold), during a predefined period (i.e., a fourth predefined period). That is, during the fourth predefined period, each time when a terminal is associated with the AP, the strength of the signal between the terminal and the AP when the terminal is associated with the AP is larger than the fifth strength threshold. In this disclosure, the strength of the signal when the terminal is associated with the AP can be the strength of the signal measured during the terminal is associated with the AP (i.e., during the terminal performs operations to be connected to the AP). In this way, whether an AP is a non-edge AP can be determined more accurately.

Figure 2:
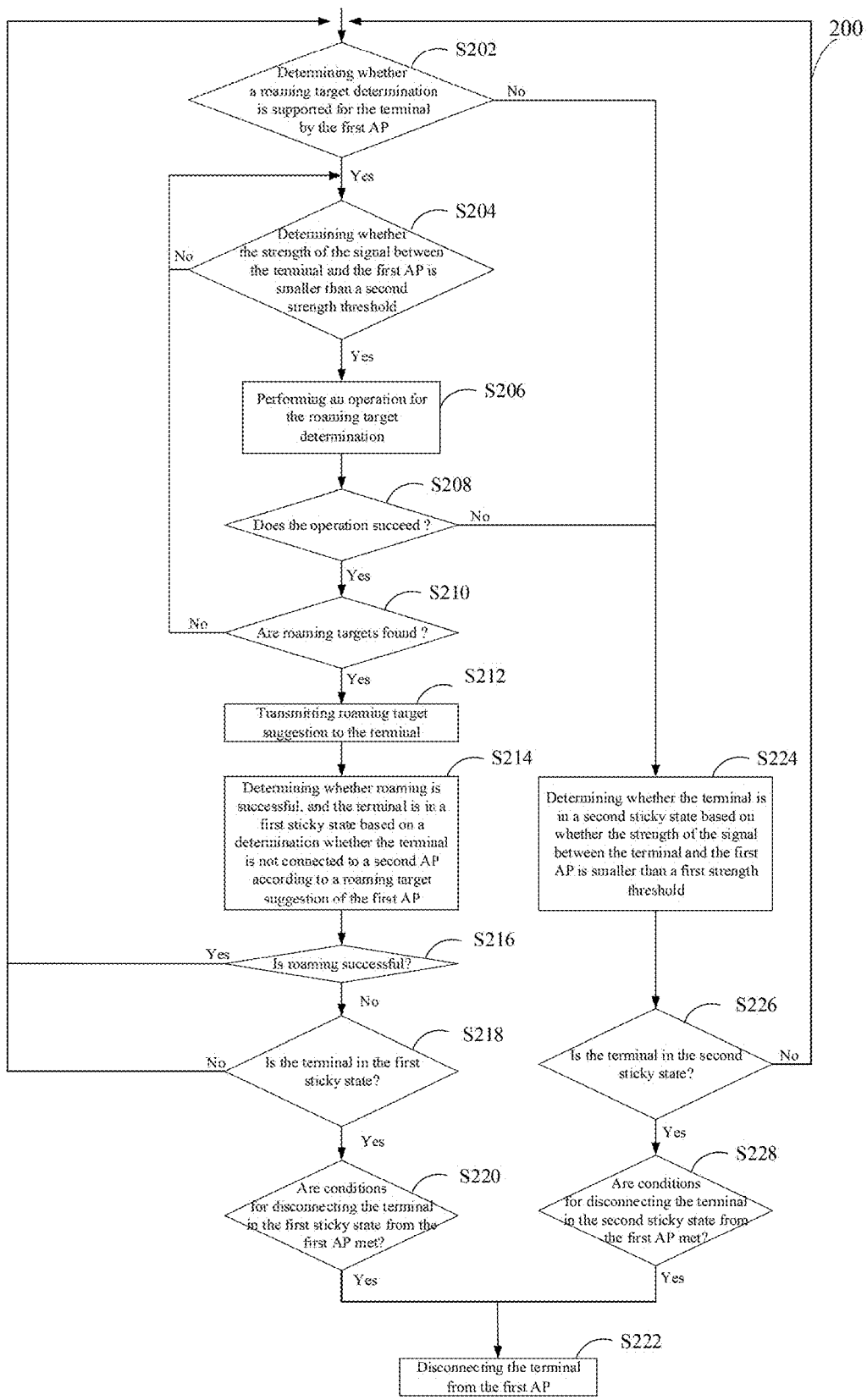
FIG. 2 is a schematic diagram illustrating determining and processing a terminal in a sticky state according to an embodiment of the present disclosure.

FIG. 2 is a schematic diagram 200 illustrating determining and processing a terminal in a sticky state according to an embodiment of the present disclosure.

As shown in FIG. 2, the method for determining and processing the terminal in the sticky state starts at block S202. At block S202, it is determined whether a roaming target determination is supported for the terminal by the first AP. If it is determined that the roaming target determination is not supported, the method proceeds to one or more of S224, S226, S228 and S222, in which it is determined whether the terminal is in a second sticky state (i.e., enabling the determination whether the terminal is in the second sticky state) and processes for the terminal in the second sticky state (e.g., disconnecting the terminal from the first AP) are performed, as described above with details omitted for brevity; else the method proceeds to S204, in which it is determined whether the strength of the signal between the terminal and the first AP is smaller than a second strength threshold. If it is determined that the strength of the signal is not smaller than the second strength threshold at S204, the method backs to S204, else the method proceeds to S206, in which an operation for the roaming target determination is performed. Then the method proceeds to S208, in which it is determined whether the operation for the roaming target determination succeeds. If it is determined the operation fails, the method proceeds to one or more of S224, S226, S228, and S222 as described above, else the method proceeds to S210, in which it is determined whether one or more roaming targets are found. If no roaming targets are found, the method backs to S204, else the method proceeds to one or more of S212, S214, S216, S218, S220, and S222, in which the roaming target suggestion is transmitted to the terminal, it is determined whether roaming is successful and the terminal is in a first sticky state (i.e., enabling the determination whether the terminal is in the first sticky state), and processes for the terminal in the first sticky state are performed (e.g., disconnecting the terminal from the first AP), as described above with details omitted for brevity.

In addition, as shown in FIG. 2, at block S218, if it is determined that the terminal is not in the first sticky state, the method can back to S202. At block S226, if it is determined that the terminal is not in the second sticky state, the method can back to S202. At blocks S220 and S228, if it is determined that disconnecting conditions are not met, other operations for the terminal in the first or the second sticky state can be performed (not shown), e.g., the operation for re-determining the terminal is a non-sticky terminal as described above (the method back to S202). Further, although it is not shown, the method shown in FIG. 2 can comprise any operation as described above with reference to FIG. 1. For example, determining whether a state of the terminal is non-switchable can be performed.

Figure 3:
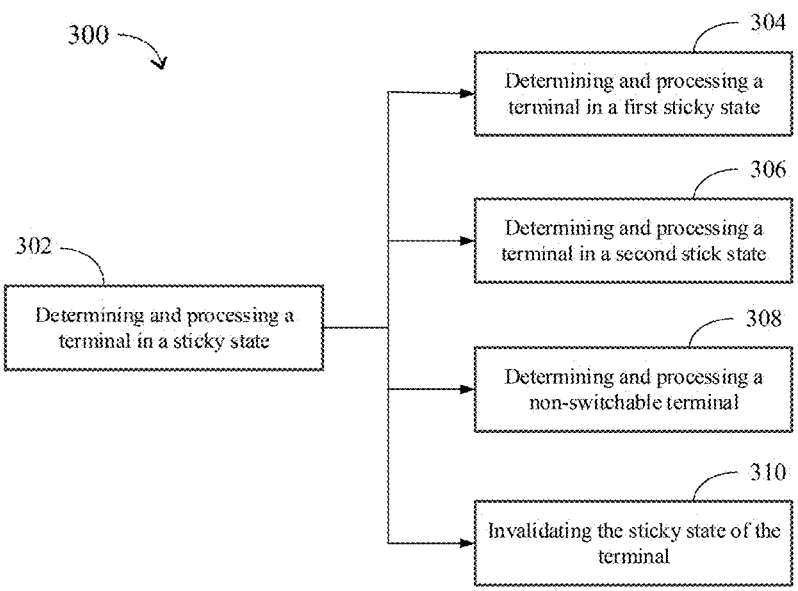
FIG. 3 is a structure diagram illustrating determining and processing a terminal in a sticky state according to an embodiment of the present disclosure.

FIG. 3 is a structure diagram 300 illustrating determining and processing a terminal in a sticky state according to an embodiment of the present disclosure. As shown in FIG. 3, determining and processing a terminal in a sticky state (302) can comprise determining and processing a terminal in a first sticky state (304), determining and processing a terminal in a second stick state (306), determining and processing a non-switchable terminal (308), and invalidating the sticky state of the terminal (310) (i.e., re-determining a terminal in the sticky state to be a non-sticky terminal). Detailed operations performed in various blocks in FIG. 3 are the same as the corresponding operations described above with reference to FIGS. 1 and 2, which are not repeated herein for brevity. In addition, various blocks shown in FIG. 3 can be performed in parallel or in sequence, which is not limited in the disclosure. Further, the various blocks shown in FIG. 3 can be implemented in hardware or software, which is not limited in the disclosure either.

In addition, please note that various strength thresholds (e.g., the first-fifth strength threshold), various predefined periods (e.g., the first-sixth predefined period) and various predefined strengths (e.g., the first and second predefined strength) can be the same or different, unless otherwise specified explicitly. Further, numerical values related to the various strength thresholds, various predefined periods, and various predefined strengths can be set based on practices and actual requirements.

In the above disclosure, the method for determining and processing a terminal in a sticky state is described with reference to FIGS. 1-3. The method performs the determination of the terminal in different sticky states (i.e., the active roaming stickiness and the passive roaming stickiness) based on whether the AP can determine whether there is a roaming target, which can be compatible with the active roaming terminals and the passive roaming terminals and determines the active roaming stickiness and the passive roaming stickiness at the same time appropriately, thereby facilitating subsequent processes. After determining the terminal is in the (first or second) sticky state, disconnecting the terminal from the currently connected AP can be performed based on disconnecting conditions, which can guarantee that the terminal is connected to a better AP without affecting the current communication of the terminal, thereby providing a better roaming experience for the client of the terminal, and improving the overall utilization efficiency of the air interface and the performance of the whole network. In the following, the disclosure will describe a communication device (e.g., AP) for determining and processing a terminal in a sticky state with reference to FIGS. 4-6.

Figure 4:
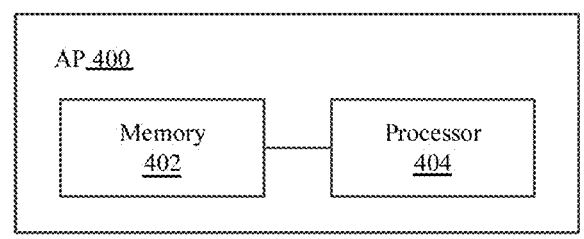
FIG. 4 is a schematic diagram of a communication device, for example an AP, according to an embodiment of the present disclosure.

FIG. 4 is a schematic diagram of a communication device 400, for example an AP, according to an embodiment of the present disclosure. As shown in FIG. 4, the communication device 400 can comprise a memory 402, and a processor 404. Exemplarily, the memory 402 can store instructions and data (e.g., produced during the processor performs method (e.g., methods 100 and 200) described according to embodiments in the disclosure. The processor 404 can be configured to determine whether a roaming target determination is supported for a terminal by a first AP, wherein the terminal is connected to the first AP; perform an operation for the roaming target determination based on determining that the roaming target determination is supported; determine that the terminal is in a first sticky state based on a determination that the terminal is not connected to a second AP according to a roaming target suggestion of the first AP, based on a finding of one or more roaming targets by the operation; and/or determine that the terminal is in a second sticky state based on a strength of a signal between the terminal and the first AP being smaller than a first strength threshold, based on determining that the roaming target determination is not supported or a failure of the operation. In addition, the memory 402 and/or the processor can be further configured to perform other operations described above with reference to FIGS. 1-3, as long as there is no contradiction among these operations.

Moreover, the communication device 400 can further comprise a receiver and a transmitter (not shown). The receiver and the transmitter can be communicatively coupled with the processor 402. The receiver and the transmitter can be separate components or can be integrated into a transceiver.

Figure 5:
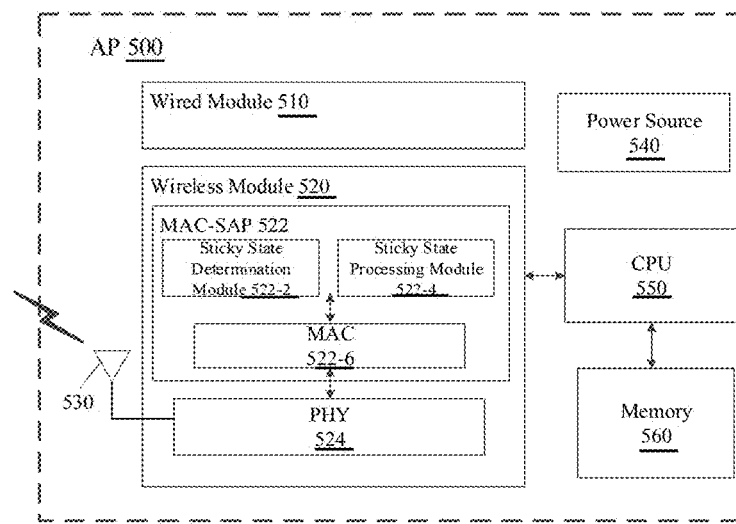
FIG. 5 shows an example configuration of a communication device, for example an AP, according to an embodiment of the present disclosure.

FIG. 5 shows an example configuration of a communication device 500, for example an AP, according to an embodiment of the present disclosure. The communication device 500 may include a wired module 510, a wireless module 520, at least one antenna 530 (for the sake of simplicity, only one antenna is shown in FIG. 5), a power source 540, a central processing unit (CPU) 550 and at least one memory 560. The wireless module 520 may further comprise a MAC-SAP (service access point) 522 (i.e., the MAC sublayer) and PHY 524 (i.e., the PHY sublayer). The MAC-SAP 522 can comprise a sticky state determination module 522-2, a sticky state processing module 522-4, and MAC 522-6. The sticky state determination module 522-2 can implement operations related to the sticky state determination as described above, which is not repeated herein for brevity. The sticky state processing module 522-4 can implement operations related to the sticky state processing as described above, which is not repeated herein for brevity.

The wireless module 520 and the CPU 550 may function together as a circuit of the communication device 500 configured to perform methods (e.g., methods 100 and 200) as described in the present disclosure. In addition, it should be understood that although FIG. 5 shows the MAC-SAP comprises only one MAC, more than one MAC can be comprised in the MAC-SAP. The configuration of the communication device (e.g., AP) shown in FIG. 5 is merely an example, but not a limitation. The configuration of the communication device (e.g., AP) in the present disclosure can comprise more or less components than those in FIG. 6.

Figure 6:
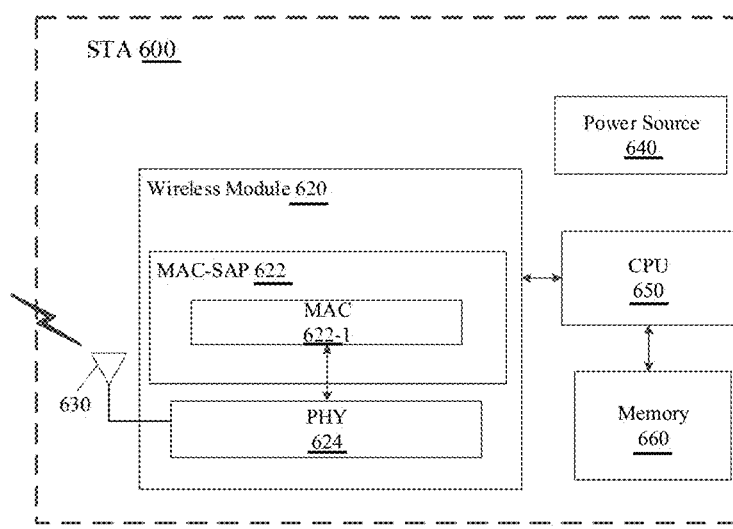
FIG. 6 shows an example configuration of a communication device, for example a non-AP or a STA, according to an embodiment of the present disclosure.

FIG. 6 shows an example configuration of a communication device 600, for example terminal (such as a STA), according to an embodiment of the present disclosure. The communication device 600 may include a wireless module 620, at least one antenna 630 (for the sake of simplicity, only one antenna is shown in FIG. 6), a power source 640, a central processing unit (CPU) 650 and at least one memory 660. The wireless module 620 may further comprise a MAC-SAP 622 (i.e., the MAC sublayer) and PHY 624 (i.e., the PHY sublayer). The MAC-SAP 622 can comprise MAC 622-1 and a measurement module (not shown). In a case where the roaming target determination is based on a signal measurement of the terminal. The measurement module can perform the signal measurement related to the roaming target determination (e.g., 11k beacon measurement).

Similar to FIG. 5, it should be understood that although FIG. 6 shows the MAC-SAP comprises only one MAC, more than one MAC can be comprised in the MAC-SAP. The configuration of the communication device (e.g., STA) shown in FIG. 6 is merely an example, but not a limitation. The configuration of the communication device (e.g., STA) in the present disclosure can comprise more or less components than those in FIG. 6.

In addition, the present disclosure further provides a communication apparatus comprising means for the methods for determining and processing a terminal in a sticky state (e.g., the methods 100 and 200) according to any embodiments of the present disclosure. Exemplarily, the communication apparatus can comprise: means for determining whether a roaming target determination is supported for a terminal by a first AP, wherein the terminal is connected to the first AP; means for performing an operation for the roaming target determination based on determining that the roaming target determination is supported; means for determining that the terminal is in a first sticky state based on a determination that the terminal is not connected to a second AP according to a roaming target suggestion of the first AP, based on a finding of one or more roaming targets by the operation; and/or means for determining that the terminal is in a second sticky state based on a strength of a signal between the terminal and the first AP being smaller than a first strength threshold, based on determining that the roaming target determination is not supported or a failure of the operation.

In addition, the present disclosure further provides a non-transitory computer readable storage medium storing a computer program thereon which, when being executed by a processor, implements the method for determining and processing a terminal in a sticky state (e.g., the methods 100 and 200) according to any embodiment of the present disclosure.

In addition, the present disclosure further provides a computer program product storing instructions which, when being executed by a processor, implements the method for determining and processing a terminal in a sticky state (e.g., the methods 100 and 200) according to any embodiment of the present disclosure.

So far, the present disclosure has disclosed the method for determining and processing a terminal in a sticky state, the communication device (e.g., AP), the communication apparatus, the non-transitory computer readable storage medium and the computer program product for the method. The provided method, the communication device and the communication apparatus can perform the determination of the terminal in different sticky states based on whether the AP can determine whether there is a roaming target, which can be compatible with the active roaming terminals and the passive roaming terminals and determines the active roaming stickiness and the passive roaming stickiness at the same time appropriately, thereby facilitating subsequent processes. After determining the terminal is in the (first or second) sticky state, disconnecting the terminal from the currently connected AP can be performed based on disconnecting conditions, which can guarantee that the terminal is connected to a better AP without affecting the current communication of the terminal, thereby providing a better roaming experience for the client of the terminal, and improving the overall utilization efficiency of the air interface and the performance of the whole network.

It should be noted that the above description is only some embodiments of the present disclosure and an illustration of the applied technical principles. It should be understood by those skilled in the art that the present disclosure scope involved in the present disclosure is not limited to the technical solutions resulted from specific combinations of the above technical features, but also encompasses other technical solutions resulted from any combination of the above technical features or their equivalents without departing from the above disclosed concept, for example, the technical solutions formed by replacing between the above features and the technical features with similar functions disclosed in the present disclosure (but not limited thereto).

In addition, although the operations are depicted in a specific order, this should not be understood as requiring these operations to be performed in the specific order shown or in a sequential order. In certain circumstances, multitasking and parallel processing may be beneficial. Likewise, although several specific implementation details are included in the above discussion, these should not be interpreted as limiting the scope of the present disclosure. Some features described in the context of separate embodiments can also be implemented in a single embodiment in combination. On the contrary, various features described in the context of a single embodiment can also be implemented in multiple embodiments alone or in any suitable sub-combination.

Although the subject matter has been described in a language specific to structural features and/or logical acts of methods, it should be understood that the subject matter defined in the appended claims is not necessarily limited to the specific features or acts described above. On the contrary, the specific features and actions described above are merely example forms of implementing the claims.

What is claimed is:

1. A method performed by a first access point (AP) for determining a terminal in a sticky state, which is connected to the first AP, the method comprising:
   determining whether a roaming target determination is supported for the terminal by the first AP;
   performing an operation for the roaming target determination in response to the roaming target determination being supported for the terminal by the first AP;
   determining that the terminal is in a second sticky state based on a strength of a signal between the terminal and the first AP being smaller than a first strength threshold, in response to the roaming target determination not being supported or a failure of the operation for the roaming target determination.

2. The method of claim 1, further comprising determining that the terminal is in a first sticky state based on a determination that the terminal is not connected to a second AP according to a roaming target suggestion of the first AP, based on a finding of one or more roaming targets by the operation, wherein the determining that the terminal is in the first sticky state comprises:
   determining that the terminal is in the first sticky state in response to the terminal being not connected to the second AP according to the roaming target suggestion of the first AP consecutively for L1 times, wherein L1 is a positive integer.

3. The method of claim 1, wherein the determining that the terminal is in the second sticky state comprises:
   determining that the terminal is in the second sticky state in response to one of:
   the strength of the signal being smaller than the first strength threshold consecutively for L2 times, or
   the strength of the signal being smaller than the first strength threshold for M times out of N times, wherein L2, M, and N are positive integers, and wherein M<N.

4. The method of claim 1, wherein the roaming target determination is supported, and wherein performing the operation for the roaming target determination comprises:
   determining whether the strength of the signal is smaller than a second strength threshold; and
   performing the operation for the roaming target determination, based on determining that the strength of the signal is smaller than the second strength threshold, wherein the second strength threshold is larger than the first strength threshold.

5. The method of claim 1, wherein the strength of the signal is at least one of a strength of an uplink signal or a strength of a downlink signal between the terminal and the first AP, and wherein the strength of the downlink signal is determined by:
   determining the strength of the uplink signal between the terminal and the first AP; and
   determining the strength of the downlink signal based on the strength of the uplink signal and a strength offset.

6. The method of claim 5, wherein the roaming target determination is based on a signal measurement performed by the terminal, and wherein the strength offset is updated based on the signal measurement and the strength of the uplink signal.

7. The method of claim 2, further comprising: based on determining that the terminal is in the first sticky state, disconnecting the terminal from the first AP in a case where:
   an amount of traffic between the terminal and the first AP is smaller than or equal to a traffic threshold, a state of the terminal is not non-switchable, and
   a communication capability of the first AP for serving the terminal is smaller than that of the second AP.

8. The method of claim 7, the communication capability of the first AP for serving the terminal is determined to be smaller than that of the second AP in response to at least one of:
   the strength of the signal between the terminal and the first AP being smaller than a third strength threshold;
   the strength of the signal between the terminal and the first AP being equal to or larger than the third strength threshold and smaller than a fourth strength threshold, a frequency band of the second AP being equal to or larger than that of the first AP, and the strength of the signal between the terminal and the second AP being larger than the strength of the signal between the terminal and the first AP by a first predefined strength; or
   the strength of the signal between the terminal and the first AP being equal to or larger than the third strength threshold and smaller than the fourth strength threshold, a throughput of the second AP being larger than that of the first AP by a predefined throughput, and the strength of the signal between the terminal and the second AP being larger than the strength of the signal between the terminal and the first AP.

9. The method of claim 1, further comprising: based on the determining that the terminal is in the second sticky state, disconnecting the terminal from the first AP in a case where:
   an amount of traffic between the terminal and the first AP is smaller than or equal to a traffic threshold, a state of the terminal is not non-switchable, and
   the first AP is a non-edge AP.

10. The method of claim 7, wherein the state of the terminal is determined to be non-switchable in a case where the terminal is connected back to the first AP in a first predefined period after being disconnected from the first AP consecutively for predefined times, or the terminal is not connected to any AP in a second predefined period after being disconnected from the first AP.

11. The method of claim 10, wherein the state of the terminal is determined to be switchable from non-switchable in a case where:
   the terminal is disconnected from the first AP; or
   a change of a location of the terminal relative to the location of the terminal when its state is determined to be non-switchable is larger than a predefined amount of change.

12. The method of claim 11, wherein the determining the change of the location to be larger than the predefined amount of change comprises:
   determining whether the terminal keeps being connected to the first AP for a third predefined period after its state is determined to be non-switchable;
   based on determining that the terminal keeps being connected to the first AP for the third predefined period, determining the change of the location to be larger than the predefined amount of change in response to $\text{abs}(ave-i) \geq s,$ where abs ( ) indicates an absolute value, ave indicates an average of last P measured strengths of the signal between the terminal and the first AP, P being an integer, i indicates the strength of the signal between the terminal and the first AP when its state is determined to be non-switchable, and s is a second predefined strength.

13. The method of claim 9, wherein the first AP is determined to be the non-edge AP in a case where there is at least one available AP around the first AP, and a strength of a signal between any terminal and the first AP when any terminal is associated with the first AP is larger than a fifth strength threshold, during a fourth predefined period.

14. The method of claim 2, wherein the terminal which is determined to be in the first sticky state is re-determined to be a non-sticky terminal in a case where the terminal is connected to the second AP according to the roaming target suggestion of the first AP or a period for which the terminal is in the first sticky state is larger than a fifth predefined period.

15. The method of claim 1, wherein the terminal which is determined to be in the second sticky state is re-determined to be a non-sticky terminal in a case where the terminal is connected to the second AP, or a period for which the terminal is in the second sticky state is larger than a sixth predefined period, or the strength of the signal between the terminal and the first AP is not smaller than the first strength threshold, or the terminal is disconnected from the first AP.

16. The method of claim 1, wherein the determining whether the roaming target determination is supported for the terminal by the first AP comprises:
  determining whether the terminal supports a determination of strengths of signals of one or more AP around the first AP;
  determining whether the roaming target determination is supported for the terminal by the first AP based on whether the terminal supports the determination of strengths of signals of one or more AP around the first AP.

17. A first access point (AP) for determining a terminal in a sticky state, which is connected to the first AP, comprising:
  a memory; and
  a processor coupled with the memory and configured to:
    determine whether a roaming target determination is supported for the terminal by the first AP;
    perform an operation for the roaming target determination in response to the roaming target determination being supported for the terminal by the first AP;
    determining that the terminal is in a second sticky state based on a strength of a signal between the terminal and the first AP being smaller than a first strength threshold, in response to determining that the roaming target determination not being supported or a failure of the operation for the roaming target determination.

18. The AP of claim 17, the processor further configured to:
  determine that the terminal is in a first sticky state based on a determination that the terminal is not connected to a second AP according to a roaming target suggestion of the first AP, based on a finding of one or more roaming targets by the operation;
  based on the determining that the terminal is in the first sticky state, disconnect the terminal from the first AP in a case where:
    an amount of traffic between the terminal and the first AP is smaller than or equal to a traffic threshold,
    a state of the terminal is not non-switchable, and
    a communication capability of the first AP for serving the terminal is smaller than that of the second AP.

19. The AP of claim 17, the processor further configured to:
  based on determining that the terminal is in the second sticky state, disconnect the terminal from the first AP in a case where:
    an amount of traffic between the terminal and the first AP is smaller than or equal to a traffic threshold,
    a state of the terminal is not non-switchable, and
    the first AP is a non-edge AP.

20. A non-transitory computer readable medium storing instructions, when executed by a processor, causing the processor to:
  determine whether a roaming target determination is supported for a terminal by a first AP, wherein the terminal is connected to the first AP;
  perform an operation for the roaming target determination in response to the roaming target determination being supported for the terminal by the first AP;
  determining that the terminal is in a second sticky state based on a strength of a signal between the terminal and the first AP being smaller than a first strength threshold, in response to the roaming target determination not being supported or a failure of the operation for the roaming target determination.

* * * * *